(12) United States Patent
Kibens et al.

(10) Patent No.: US 8,350,199 B2
(45) Date of Patent: Jan. 8, 2013

(54) APPARATUS TO REDUCE THRUST OSCILLATIONS IN A LAUNCH VEHICLE

(75) Inventors: Valdis Kibens, St. Charles, MO (US); Edward Andrew Whalen, St. Louis, MO (US)

(73) Assignee: The Boeing Company, Chicago, IL (US)

( * ) Notice: Subject to any disclaimer, the term of this patent is extended or adjusted under 35 U.S.C. 154(b) by 1122 days.

(21) Appl. No.: 12/352,811

(22) Filed: Jan. 13, 2009

(65) Prior Publication Data

US 2010/0176247 A1  Jul. 15, 2010

(51) Int. Cl.
*F41G 7/00* (2006.01)
(52) U.S. Cl. .............................. 244/3.1; 244/63; 60/254
(58) Field of Classification Search .................. 244/3.1, 244/3.21, 3.22, 62, 63, 158.1, 171.1, 171.3; 60/253, 254; 102/202, 286, 287, 291
See application file for complete search history.

(56) References Cited

U.S. PATENT DOCUMENTS

| | | | | |
|---|---|---|---|---|
| 3,035,958 | A | * | 5/1962 | Wilkins ........................ 156/294 |
| 3,315,472 | A | * | 4/1967 | Moutet et al. ................... 60/251 |
| 3,327,481 | A | * | 6/1967 | Horvath ......................... 60/255 |
| 3,423,943 | A | * | 1/1969 | Stark ............................. 60/251 |
| 3,795,106 | A | * | 3/1974 | Cherry et al. ................... 60/255 |
| 4,263,071 | A |   | 4/1981 | Bain et al. |
| 4,574,699 | A |   | 3/1986 | Bolieau |
| 4,760,695 | A | * | 8/1988 | Brown et al. ................... 60/204 |
| 4,765,134 | A | * | 8/1988 | Brown et al. ................... 60/204 |
| 5,613,358 | A | * | 3/1997 | Humiston et al. .............. 60/250 |
| 6,073,437 | A |   | 6/2000 | Jones |
| 7,003,942 | B2 | * | 2/2006 | Le Helley et al. .............. 60/219 |

OTHER PUBLICATIONS

"A Mechanical Attachment Designed for the Rapid Installation/Removal of Large TPS Panels on Cryotanks and Airframes", Ames Research Center, Moffett Field, CA, Jun. 15, 2001, ARC-14052 ATTI Section 6, Subsection HTP, pp. 1-3.
"NASA Devises Solution for Ares Rocket Thrust Oscillation Problem", Space & Missile Defense Report, Aug. 25, 2008, pp. 1-2.
Bergin, "Ares I Thurst Oscillation mitigation—the current state of play", Apr. 2, 2008, pp. 1-7, www.nasaspaceflight.com.
Fabignon et al., "Instabilities and pressure oscillations in solid rocket motors", Elsevier, Aerospace Science and Technology, 7 (2003) pp. 191-200.
Dotson et al., "Structural Dynamic Analysis of Solid Rocket Motor Resonant Burning", Journal of Propulsion and Power, vol. 17, No. 2, Mar.-Apr. 2001, pp. 347-354.
Blomshield et al., "Pressure Oscillations in Post-Challenger Space Shuttle Redesigned Solid Rocket Motors", Journal of Propulsion and Power, vol. 9, No. 2, Mar. Apr. 1993, pp. 217-221.

(Continued)

*Primary Examiner* — Tien Dinh
*Assistant Examiner* — Michael Kreiner
(74) *Attorney, Agent, or Firm* — Yee & Associates, P.C.

(57) ABSTRACT

A launch vehicle comprising a casing, a solid propellant, a channel, a geometric feature, and a suppression structure. The solid propellant is located within the casing. The channel is through the solid propellant, and the geometric feature is in the channel. The suppression structure is located around a centerline for the channel and located upstream in a flow path from the geometric feature.

13 Claims, 8 Drawing Sheets

OTHER PUBLICATIONS

Stanek et al., "AIAA 2001-2128 Suppression of Cavity Resonance Using High Frequency Forcing—The Characteristic Signature of Effective Devices", 2001 American Institute of Aeronautics & Astronautics, 7th AIAA/CEAS Aeroacoustics Conference, May 2001, Maastricht, The Netherlands, pp. 1-18.

Bower et al., High Frequency Excitation Active Flow Control for High-Speed Weapon Release (HIFEX), 2004, American Institute of Aeronautics and Astronautics Inc., 2nd AIAA Flow Control Conference, Jun. 28-Jul. 1, 2004, Portland, Oregon, pp. 1-13.

* cited by examiner

APPARATUS TO REDUCE THRUST OSCILLATIONS IN A LAUNCH VEHICLE

BACKGROUND INFORMATION

1. Field

The present disclosure relates generally to launch vehicles and, in particular, to solid propellant launch vehicles. Still more particularly, the present disclosure relates to a method and apparatus for reducing oscillations that may be caused during the generation of thrust by a solid propellant launch vehicle.

2. Background

Launch vehicles are used to transport payloads.

These payloads include, for example, passengers, satellites, shuttles, and other suitable objects. Launch vehicles with solid fuel rockets may be used in lifting the payload. Further, solid fuel rockets also may be used in missiles containing explosive payloads.

One phenomena that may be present with solid rockets is thrust oscillation. This type of oscillation is also referred to as resonant burning. Thrust oscillation is caused by an internal fluid oscillation in pressure. This oscillation is reinforced and amplified by the resonant properties of the combustion chamber. The resonant properties of the combustion chamber are excited by interactions between the combustion chamber shear layer and internal elements of the chamber geometry. Thrust oscillation may shake the entire launch vehicle. Thrust oscillations may occur from vortical structures shed or generated in the solid rocket motor. Acoustic feedback in the flow of gases may result in these oscillations.

Thrust oscillations may be significant. For example, thrust oscillations of up to around 100,000 pounds may occur. Discomfort for passengers, damage to electronic payloads, navigation problems, and/or other issues may occur as a result of these oscillations.

Some solutions have included modifying the geometry of the rocket. This change has included modifications to the length of the rocket, grain configuration, and baffles. Propellant additives have included substances, such as aluminum. The structure modifications include, for example, tuned dampening systems. In some cases, the structural design of the vehicle and payload may be dictated by the loads imposed by thrust oscillations. These types of constraints, however, may be undesirable and may result in increased cost, weight, and/or reduced efficiencies.

Therefore, it would be advantageous to have a method and apparatus that takes into account one or more of the issues discussed above, as well as possible other issues.

SUMMARY

In one advantageous embodiment, a launch vehicle comprises a casing, a solid propellant, a channel, a geometric feature, and a suppression structure. The solid propellant is located within the casing. The channel is through the solid propellant, and the geometric feature is in the channel. The suppression structure is located around a centerline for the channel and located upstream in a flow path from the geometric feature.

In another advantageous embodiment, a launch vehicle comprises a casing, a solid propellant, a channel, and a circle-shaped rod. The solid propellant has a first segment and a second segment located within the casing. A gap is present between the first segment and the second segment. The channel is through the solid propellant. The circle-shaped rod is attached to the casing and located around a centerline for the channel and located in a position upstream from the gap in a flow path in the channel. The circle-shaped rod has a cross-sectional diameter capable of generating perturbations at a frequency during a generation of thrust and a diameter capable of generating perturbations at a radial location in the flow path during the generation of thrust. The cross-sectional diameter, the diameter, and the position are selected to reduce oscillations in the launch vehicle during the generation of thrust using the solid propellant.

In yet another advantageous embodiment, a method is present for reducing oscillations in a launch vehicle. A geometric feature is identified in a channel through a solid propellant in a casing for the launch vehicle. A suppression structure is placed around a centerline for the channel and upstream in a flow path from the geometric feature.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof, will best be understood by reference to the following detailed description of an advantageous embodiment of the present disclosure when read in conjunction with the accompanying drawings, wherein:

DETAILED DESCRIPTION

Figure 1:
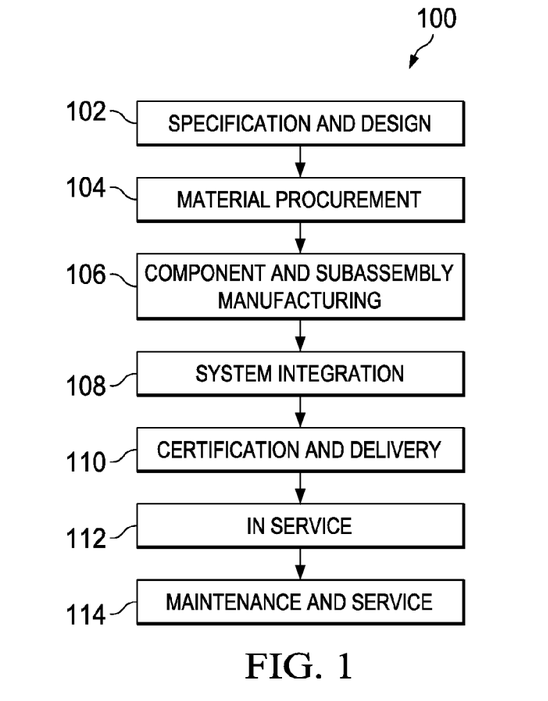
FIG. 1 is a diagram illustrating a launch vehicle manufacturing and service method in accordance with an advantageous embodiment.
Figure 2:
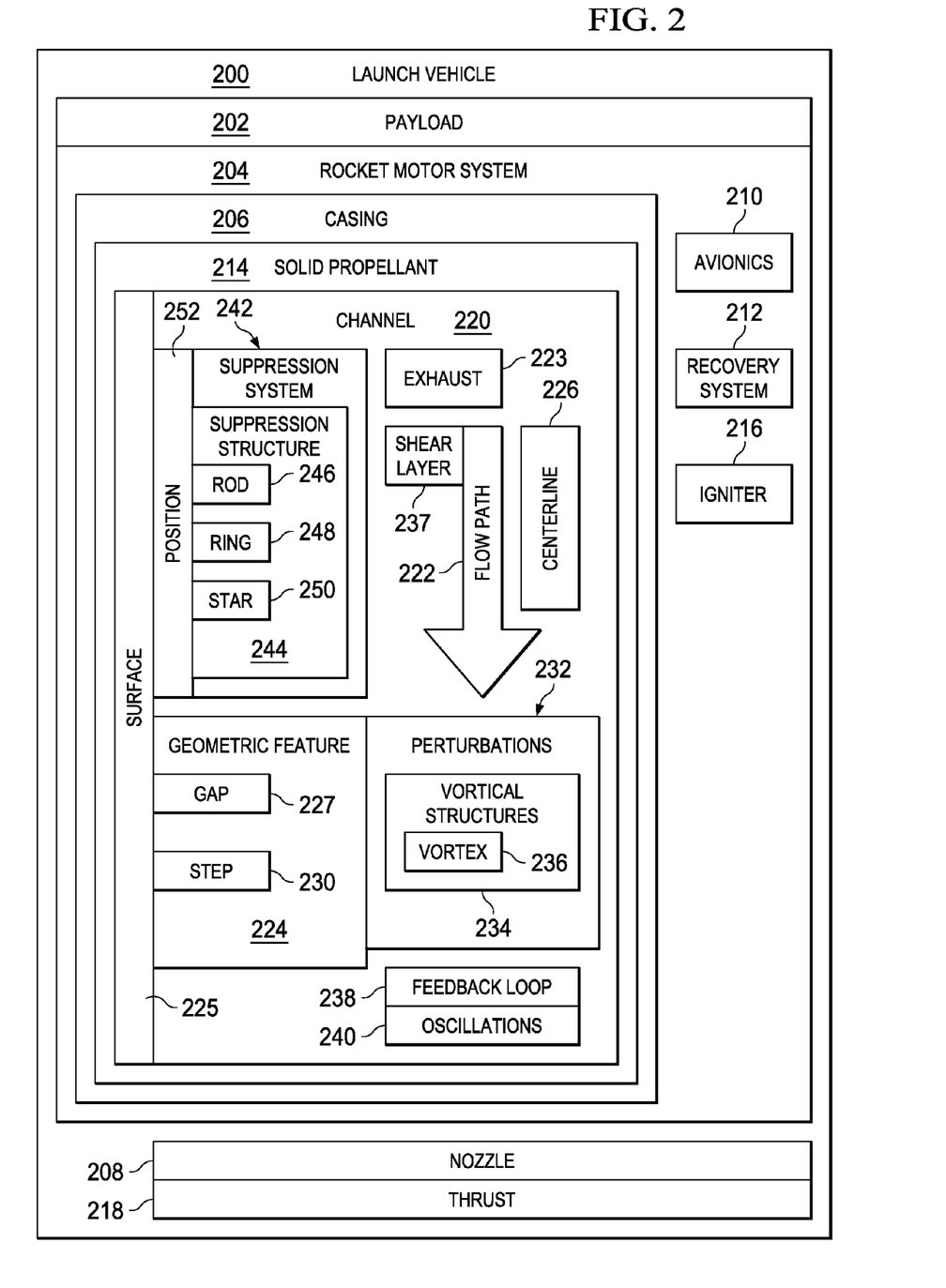
FIG. 2 is a block diagram of a launch vehicle in accordance with an advantageous embodiment.

Referring more particularly to the drawings, embodiments of the disclosure may be described in the context of launch vehicle manufacturing and service method 100 as shown in FIG. 1 and launch vehicle 200 as shown in FIG. 2. Turning first to FIG. 1, a diagram illustrating a launch vehicle manufacturing and service method is depicted in accordance with an advantageous embodiment. During pre-production, exemplary launch vehicle manufacturing and service method 100 may include specification and design 102 of launch vehicle 200 in FIG. 2 and material procurement 104.

During production, component and subassembly manufacturing 106 and system integration 108 of launch vehicle 200 in FIG. 2 takes place. Thereafter, launch vehicle 200 in FIG. 2 may go through certification and delivery 110 in order to be placed in service 112. While in service by a customer, launch vehicle 200 in FIG. 2 is scheduled for routine maintenance and service 114, which may include modification, reconfiguration, refurbishment, and other maintenance or service.

Each of the processes of launch vehicle manufacturing and service method 100 may be performed or carried out by a system integrator, a third party, and/or an operator. In these examples, the operator may be a customer. For the purposes of this description, a system integrator may include, without limitation, any number of launch vehicle manufacturers and major-system subcontractors; a third party may include, without limitation, any number of venders, subcontractors, and suppliers; and an operator may be a company, a military entity, a service organization, and so on.

With reference to FIG. 2, a block diagram of a launch vehicle is depicted in accordance with an advantageous embodiment. Launch vehicle 200 is depicted in block form, in this example, to describe different components and functions of launch vehicle 200.

Launch vehicle 200 includes payload 202 and rocket motor system 204. Payload 202 may take various forms. For example, payload 202 may be passengers, scientific equipment, a satellite, and/or some other suitable type of object. Rocket motor system 204 provides the thrust to move payload 202.

In this example, rocket motor system 204 includes casing 206 and nozzle 208. Rocket motor system 204 also may include avionics 210, which may control the direction of nozzle 208. Further, rocket motor system 204 may include recovery system 212, which may be used to recover rocket motor system 204 after use. For example, recovery system 212 may take the form of a parachute.

Solid propellant 214 is another component in rocket motor system 204. Igniter 216 may be used to ignite solid propellant 214 to cause the generation of thrust 218.

Channel 220 is present within solid propellant 214 in these examples. Channel 220 provides a channel in which flow path 222 may be present when solid propellant 214 is ignited to generate thrust 218. Flow path 222 is a path in which exhaust 223 moves. Exhaust 223 may take the form of gasses and/or particles generated by the burning of solid propellant 214.

Geometric feature 224 may be present within channel 220. Geometric feature 224 is different changes in the surface of channel 220. Geometric feature 224 may be a change in surface 225 relative to centerline 226. Centerline 226 may be an axis running centrally through channel 220.

Geometric feature 224 may include, for example, without limitation, gap 227, step 230, and/or other geometric features that may be present within channel 220. Gap 227 may occur between the pouring of different segments of solid propellant 214 in casing 206 during manufacturing of rocket motor system 204. Gap 227 may result from a joint in casing 206. Step 230 may be a change in the width of channel 220 relative to centerline 226.

The different advantageous embodiments recognize and take into account that geometric feature 224 may cause perturbations 232 in flow path 222. A perturbation is a change in the flow of exhaust 223 generated during the burning of solid propellant 214 to generate oscillations 240 in thrust 218 in flow path 222.

The different advantageous embodiments recognize and take into account that perturbations 232 may take the form of vortical structures 234 in which vortex 236 is one structure within vortical structures 234. A vortex may be a spinning and/or turbulent flow within flow path 222. Vortical structures 234 may be generated by flow path 222 encountering geometric feature 224.

The different advantageous embodiments recognize and take into account that when perturbations 232, such as vortical structures 234, enter shear layer 237 in flow path 222, vortical structures 234 may interact with geometric feature 224 in a manner that generates feedback loop 238. Shear layer 237 is a portion or layer of exhaust 223 in flow path 222 that contacts surface 225 in solid propellant 214. The different advantageous embodiments recognize that feedback loop 238 and other interactions may result in oscillations 240.

The different advantageous embodiments recognize that oscillations may involve two types of oscillations. One type of oscillation may be an oscillation driven by the full length of the channel of the rocket, in which the oscillations may be equal to the frequency of the oscillation of thrust 218. Another type of oscillation has a frequency generated by a suppression structure.

In some of the advantageous embodiments, a suppression structure may generate a particular frequency of oscillations in the exhaust that is several times higher than the frequency of the basic thrust oscillation caused by the geometric feature. The oscillation generated by suppression structure 244 may interact with the exhaust to avoid a buildup of oscillations from the channel from building up from exhaust 223 interacting with geometric feature 224.

The different advantageous embodiments recognize and take into account that currently available solutions may not provide desirable results. Some solutions may increase the expense and weight of rocket motor system 204, while other systems may be ineffective for desired levels of thrust 218.

Thus, one or more of the different advantageous embodiments provide suppression system 242 that is capable of reducing and/or eliminating the interaction of perturbations 232 with geometric feature 224 in a manner that reduces and/or eliminates undesired levels of oscillations 240.

In these different advantageous embodiments, suppression system 242 includes suppression structure 244. Suppression structure 244 may take various forms. For example, suppression structure 244 may take the form of rod 246. Rod 246 may have various shapes, depending on the particular implementation. Rod 246 may be in the shape of ring 248, star 250, and/or some other suitable shape.

In some examples, suppression structure 244 may include multiple rods of different shapes that may be nested within each other. The cross section of rod 246 also may have various shapes. For example, rod 246 may have a circular cross section, an oval cross section, an octagonal cross section, or some other suitable shape.

Suppression structure 244 may be located in position 252 upstream of flow path 222 in a manner that causes perturbations 232 to be generated, such that they avoid interaction with geometric feature 224. Further, suppression structure 244 also may reduce and/or prevent perturbations 232 from being generated by geometric feature 224.

The illustration of launch vehicle 200 in FIG. 2 is not meant to imply physical or architectural limitations to the manner in which different launch vehicles may be implemented. Other components in addition to, or in place of, the ones illustrated may be present in different advantageous embodiments. Further, in some advantageous embodiments, some of the components illustrated for launch vehicle 200 may be omitted.

For example, in some advantageous embodiments, a self-destruct system may be included in launch vehicle 200 to destroy rocket motor system 204. As another example, additional suppression structures, in addition to suppression structure 244, may be present for suppression system 242, depending on the number of geometric features present. In yet other advantageous embodiments, rocket motor system 204 may include another casing and nozzle in addition to casing 206 and nozzle 208. With this type of implementation, rocket motor system 204 may be a multi-stage rocket with multiple rocket motors.

Figure 3:
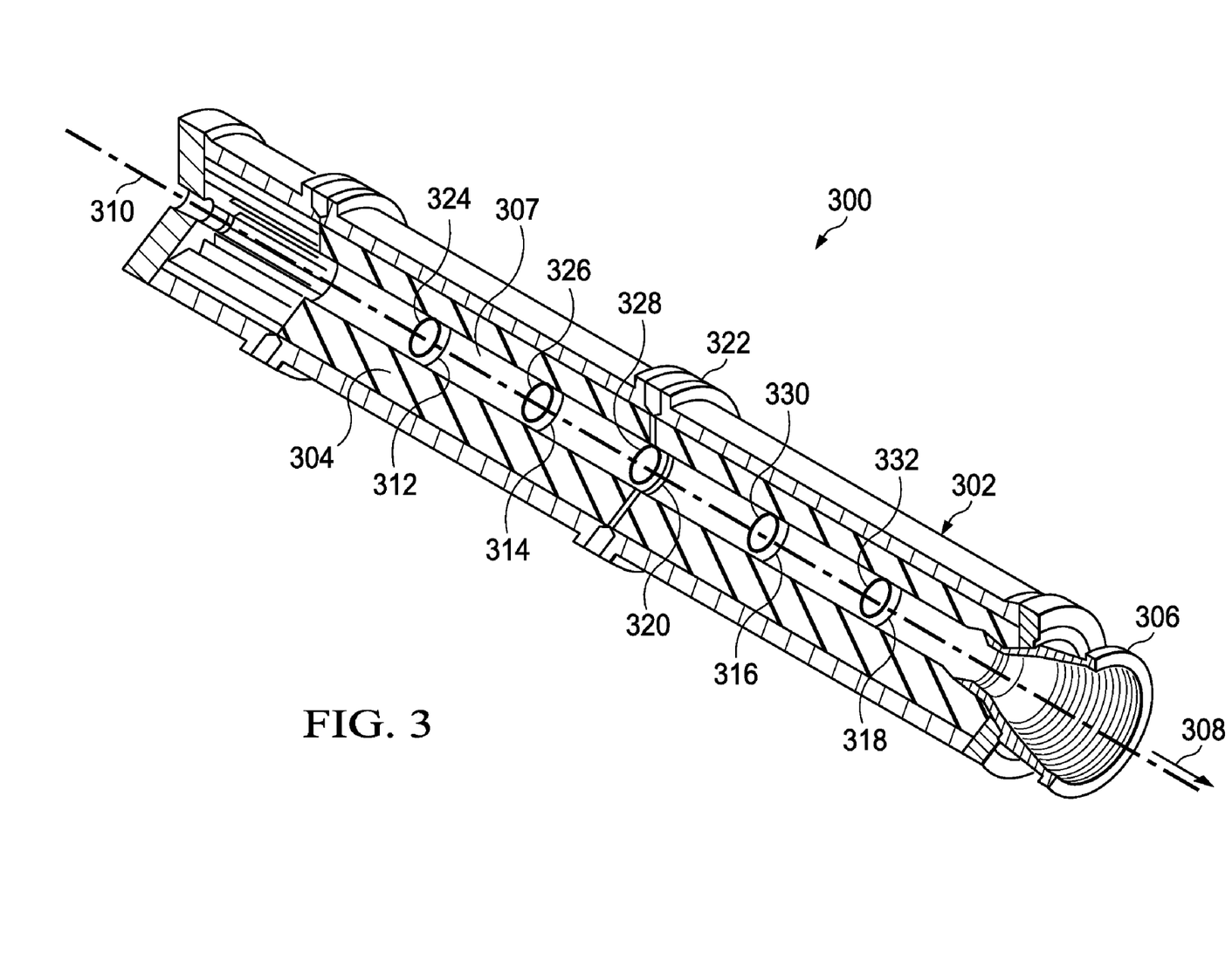
FIG. 3 is a diagram of an exposed view of a rocket motor system in accordance with an advantageous embodiment.

Turning now to FIG. 3, a diagram of an exposed view of a rocket motor system is depicted in accordance with an advantageous embodiment. Rocket motor system 300 is an example of one implementation of rocket motor system 204 in FIG. 2.

As can be seen in this exposed view, casing 302 encompasses solid propellant 304 in rocket motor system 300, which is connected to nozzle 306. Channel 307 is present in which flow path 308 extends along centerline 310 within channel 307. Flow path 308 is the direction of flow for exhaust generated by the burning of solid propellant 304. In this illustrative example, a number of different geometric features are present in rocket motor system 300. Gaps 312, 314, 316, and 318 are present in this depicted example. These gaps may be caused by forming solid propellant 304 in different segments. Additionally, gap 320 also is present. Gap 320 may be caused by joint 322 in casing 302.

In these illustrative examples, suppression structures 324, 326, 328, 330, and 332 are located inside of casing 302. These suppression structures may be located within channel 307 in solid propellant 304. In some advantageous embodiments, these suppression structures may be embedded within solid propellant 304. Further, these suppression structures also may be attached and/or secured to casing 302.

In the different advantageous embodiments, these suppression structures are located in positions upstream of the different geometric features with reference to flow path 308. For example, suppression structures 324, 326, 330, and 332 are located upstream of gaps 312, 314, 316, and 318. Suppression structure 328 is located upstream of gap 320 relative to flow path 308.

Figure 4:
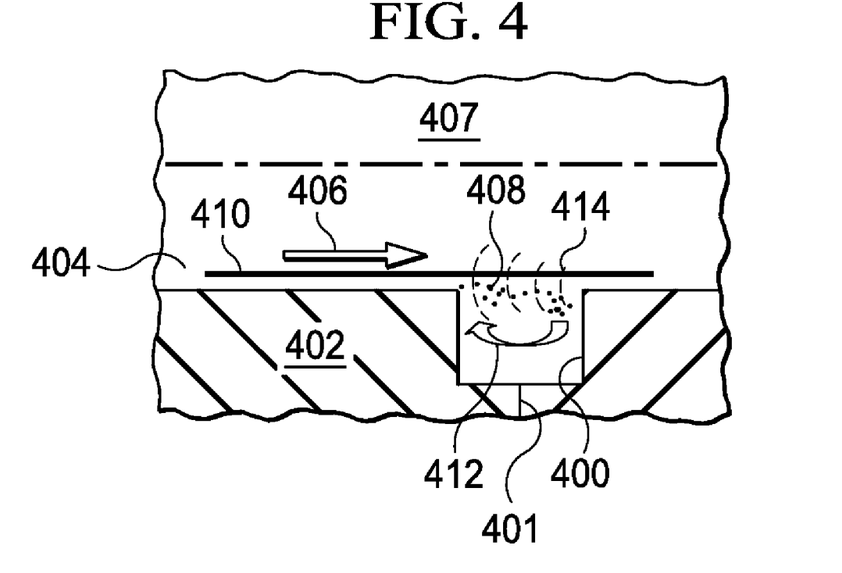
FIG. 4 is a diagram illustrating the generation of perturbations that may alleviate oscillations in a rocket motor system in accordance with an advantageous embodiment.

With reference now to FIG. 4, a diagram illustrating the generation of perturbations that may alleviate oscillations in a rocket motor system is depicted. In this example, gap 400 in joint 401 is an example of a geometric feature present within solid propellant 402. Gap 400 may be the result of a joint such as, for example, a field joint or a factory joint. As solid propellant 402 burns exhaust moving in flow path 406 in channel 407 at upstream location 404, perturbations 408 may occur within shear layer 410.

These perturbations may interact with gap 400 in a manner that causes feedback 412. This interaction may generate pressure waves 414, which may result in changes in thrust. Thus, feedback 412 may result in oscillations in thrust having a level that may be undesirable.

Figure 5:
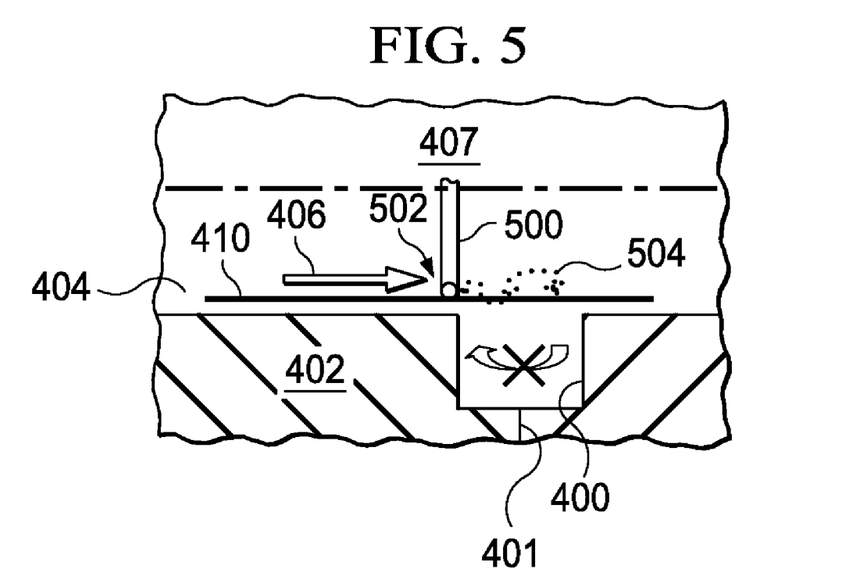
FIG. 5 is a diagram illustrating the use of a suppression structure in accordance with an advantageous embodiment.

With reference now to FIG. 5, a diagram illustrating the use of a suppression structure is depicted in accordance with an advantageous embodiment. In this example, suppression structure 500 may be located in position 502 upstream of gap 400 relative to flow path 406.

The use of suppression structure 500 may result in perturbation 504 being generated in a manner that enters shear layer 410 that minimizes and/or eliminates interaction of perturbation 504 with gap 400. The reduction or elimination of interaction of perturbation 504 with gap 400 is in a manner that minimizes and/or eliminates feedback loop 412 as illustrated in FIG. 4. As a result, oscillations may be reduced and/or eliminated.

Figure 6:
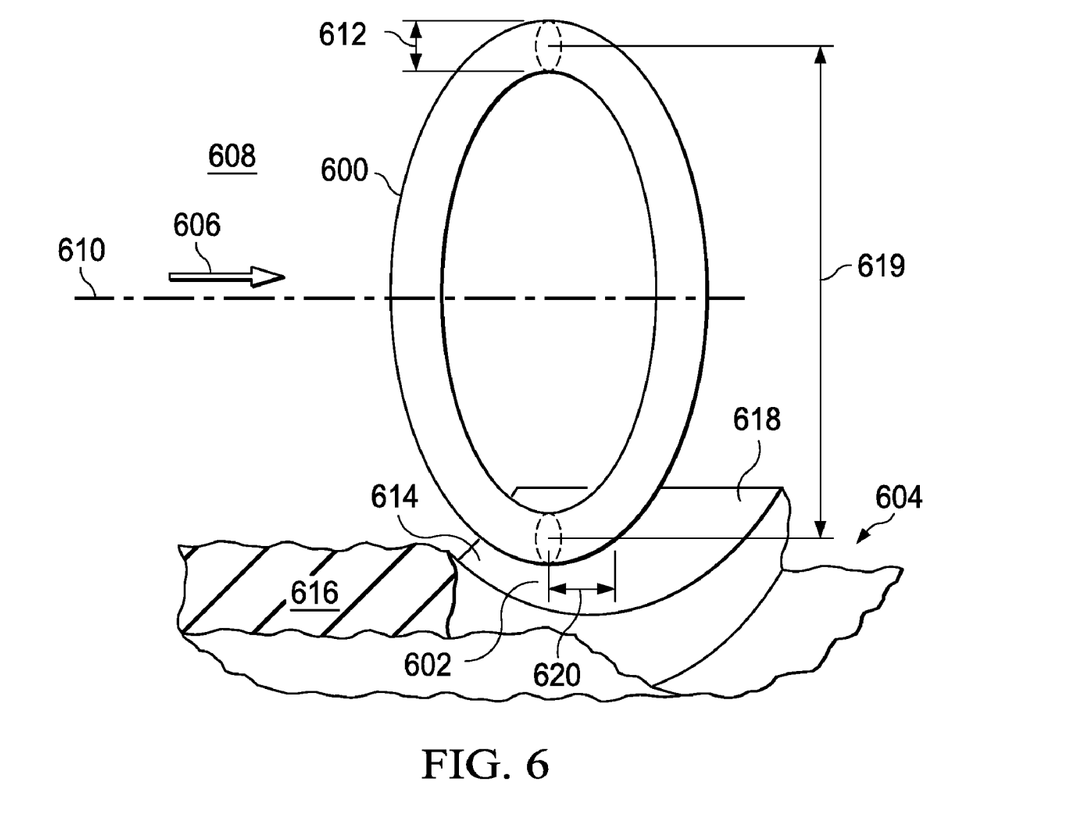
FIG. 6 is a diagram illustrating positioning of a suppression structure in accordance with an advantageous embodiment.

With reference now to FIG. 6, a diagram illustrating positioning of a suppression structure is depicted in accordance with an advantageous embodiment. In this illustrative example, suppression structure 600 is an example of one implementation of suppression structure 244 in FIG. 2.

Suppression structure 600 takes the form of a rod having a ring shape. In this example, suppression structure 600 is located in position 602 upstream of step 604 relative to flow path 606 in channel 608. Suppression structure 600 is located around centerline 610 in channel 608. The upstream positioning of suppression structure 600 allows suppression structure 600 to interact with flow path 606 in a manner that generates perturbations. These perturbations may reduce and/or eliminate oscillations that may be caused by step 604 without suppression structure 600.

In this illustrative example, cross-sectional diameter 612 is a diameter of the rod from which suppression structure 600 is constructed and may be used to determine the frequencies of perturbations that may be injected into shear layer 614. The frequency selected may be a frequency that is higher than the frequency of perturbations that may be generated by step 604. This higher frequency may reduce and/or prevent perturbations from being generated by step 604. Shear layer 614 is a layer in which exhaust generated by the burning of solid propellant 616 flows against surface 618 of solid propellant 616.

Suppression structure 600 generates perturbations in the exhaust with a frequency that may be some number of times higher than the frequency of the base oscillation that may be generated by the interaction of step 604 with the exhaust in flow path 606. This interaction may reduce and/or prevent oscillations throughout the entire channel caused by step 604. In other words, suppression structure 600 may prevent perturbations from being generated by step 604 in a manner that may cause thrust oscillations throughout the channel.

Suppression structure 600 also has diameter 619. Suppression structure 600 may fix the radial location at which perturbations may enter shear layer 614. Distance 620 is the injection point or distance from step 604 from which perturbations may be generated. The selection of cross-sectional diameter 612, diameter 619, and distance 620 may be made in a manner that reduces and/or eliminates oscillations that may be generated by step 604.

With reference now to FIGS. 7-10, diagrams illustrating different configurations of suppression structures for a rocket motor system are depicted in accordance with an advantageous embodiment.

Figure 7:
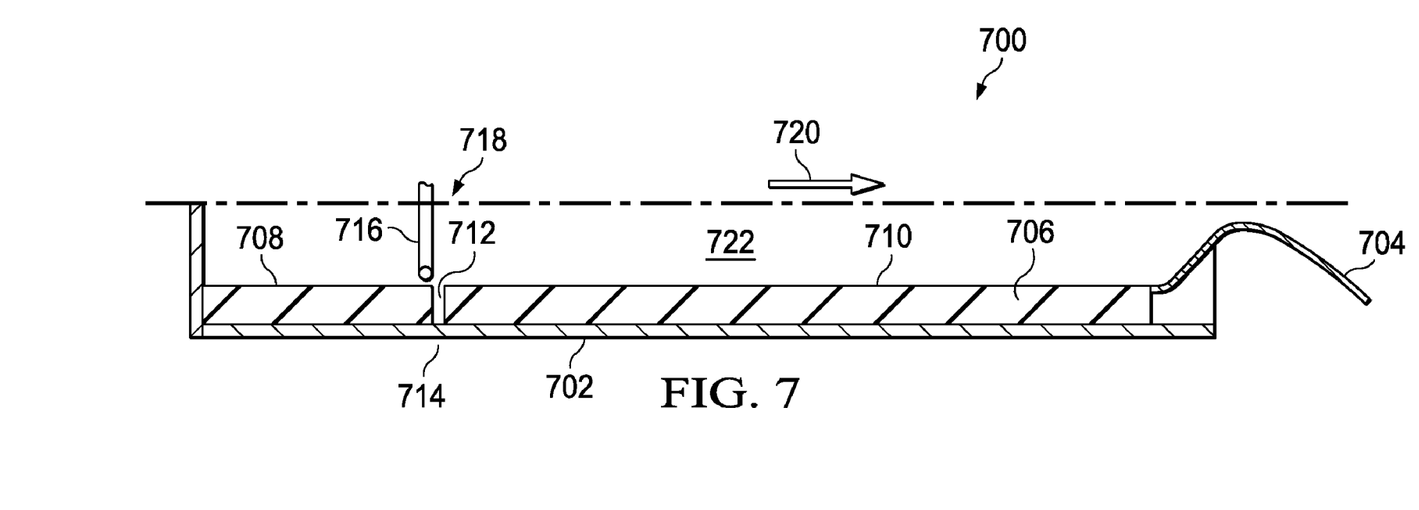
FIG. 7 is a partial cross-sectional view of a rocket motor system in accordance with an advantageous embodiment.

With reference first to FIG. 7, a partial cross-sectional view of a rocket motor system is depicted in accordance with an advantageous embodiment. Rocket motor system 700 is an example of one implementation for rocket motor system 204 in FIG. 2.

Rocket motor system 700 includes casing 702 and nozzle 704. Solid propellant 706 is located within casing 702. As can be seen in this depicted example, solid propellant 706 has segment 708 and segment 710, in which gap 712 in joint 714 is present. Suppression structure 716 is located in position 718 upstream of gap 712 for flow path 720 in channel 722.

Figure 8:
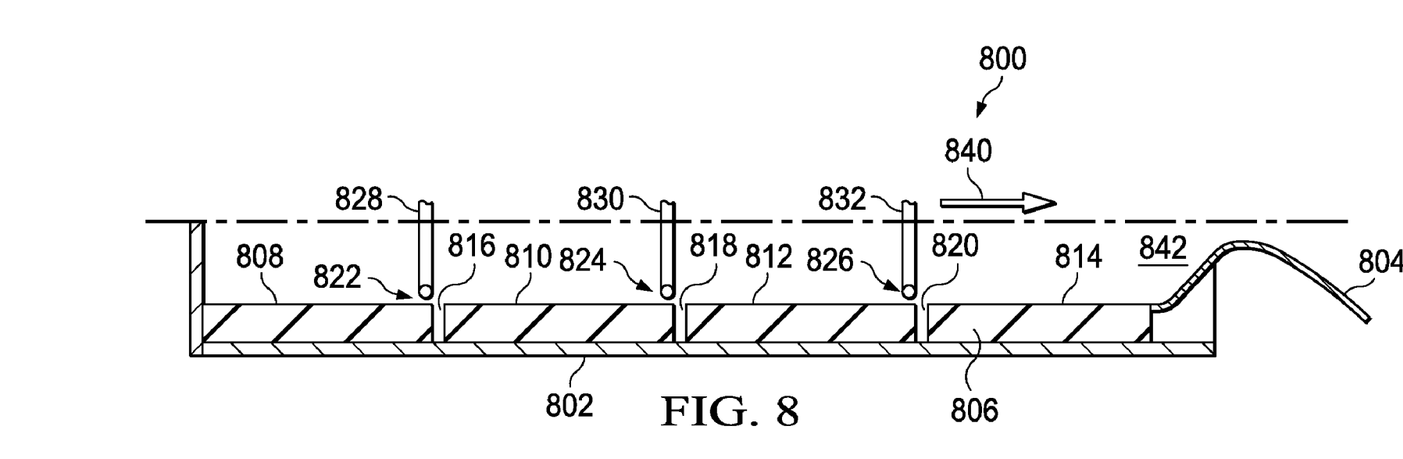
FIG. 8 is a rocket motor system in a partial cross-sectional view in accordance with an advantageous embodiment.

In FIG. 8, a rocket motor system is shown in a partial cross-sectional view in accordance with an advantageous embodiment. Rocket motor system 800 is an example of one implementation of rocket motor system 204 in FIG. 2.

Rocket motor system 800 includes casing 802 and nozzle 804. Solid propellant 806 is located within casing 802. Solid propellant 806 has segments 808, 810, 812, and 814 in this illustrative example. Gaps 816, 818, and 820 may be present between these segments. With these geometric features, suppression structures 828, 830, and 832 may be placed upstream of gaps 816, 818, and 820 in locations 822, 824, and 826 relative to flow path 840 in channel 842.

Figure 9:
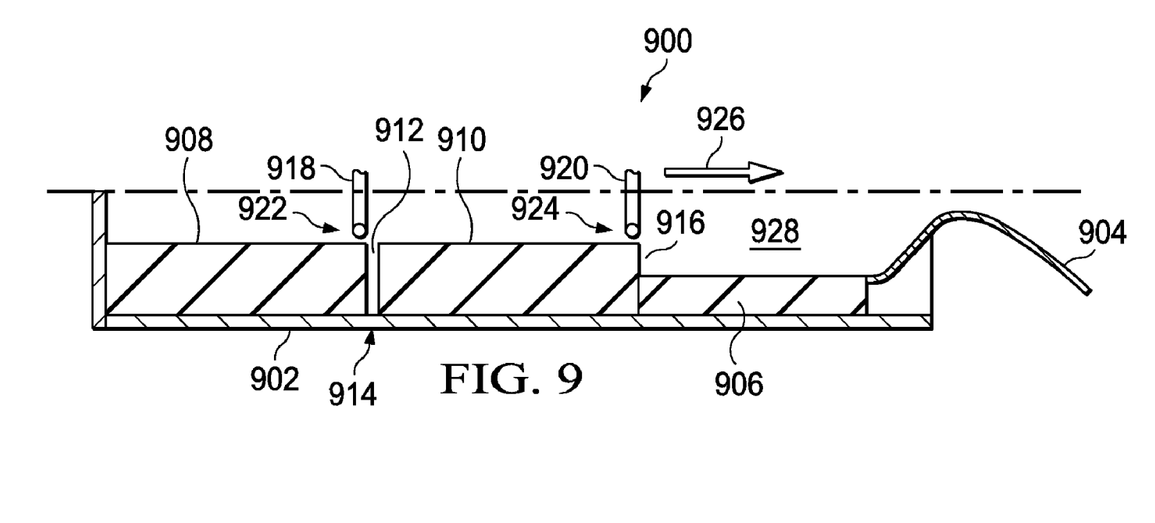
FIG. 9 is a rocket motor system and suppression structure in a partial cross-sectional view in accordance with an advantageous embodiment.

In FIG. 9, another configuration for a rocket motor system and suppression structure is depicted in a partial cross-sectional view in accordance with an advantageous embodiment. Rocket motor system 900 is an example of an implementation of rocket motor system 204 in FIG. 2.

Rocket motor system 900 includes casing 902 and nozzle 904, with solid propellant 906 being located within casing 902. In this example, solid propellant 906 has segments 908 and 910 with gap 912 being present between these segments. Additionally, segment 910 has step 916.

In this illustrative example, the geometric features include gap 912 in joint 914, and step 916. Suppression structures 918 and 920 may be placed in positions 922 and 924 upstream of gap 912 and step 916 relative to flow path 926 in channel 928.

Figure 10:
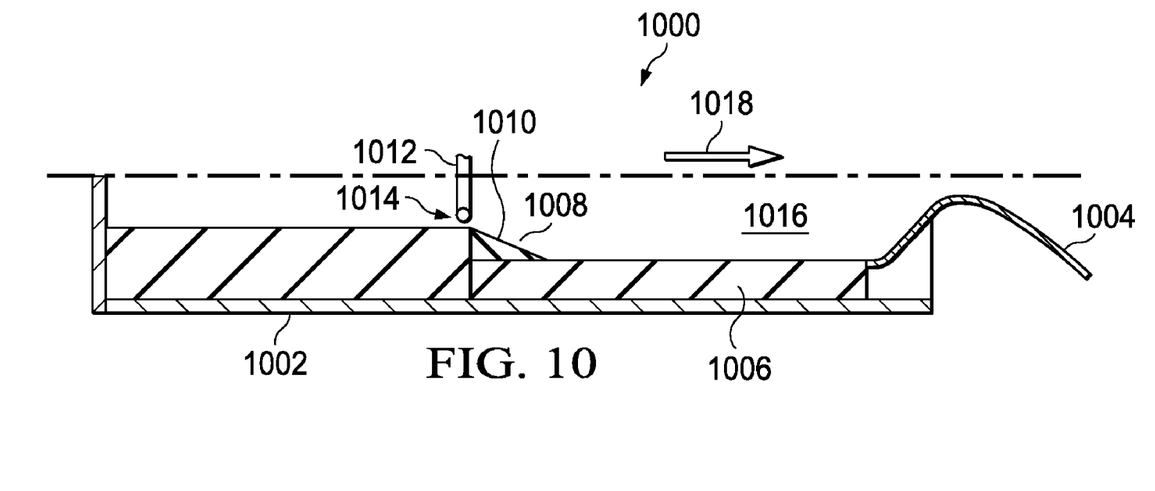
FIG. 10 is a partial cross-sectional view of a suppression structure in a rocket motor system in accordance with an advantageous embodiment.

With reference now to FIG. 10, another diagram illustrating a suppression structure in a rocket motor system in a partial cross-sectional view is depicted in accordance with an advantageous embodiment. In this example, rocket motor system 1000 is an example of another implementation for rocket motor system 204 in FIG. 2.

Rocket motor system 1000 includes casing 1002 and nozzle 1004, with solid propellant 1006 being located within casing 1002. In this illustrative example, step 1008 has angled incline 1010 within solid propellant 1006. Suppression structure 1012 is placed in position 1014 within channel 1016 upstream of step 1008 relative to flow path 1018.

In the illustrative examples, the different configurations of suppression structures in a rocket motor system in FIGS. 7-10 are illustrative examples of configurations that may be encountered within a rocket motor system. The illustration of different configurations of suppression structures in a rocket motor system in FIGS. 7-10 are not meant to imply architectural or physical limitations to the manner in which different advantageous embodiments may be implemented. For example, in some advantageous embodiments, a different shaped suppression structure may be used instead of a ring. For example, the suppression structure may take the form of a star-shaped rod or some other suitable shape, depending on the particular implementation.

Also, in these illustrative examples, the suppression structures are shown within the channel. In different advantageous embodiments, the suppression structures may be embedded within the propellant. The suppression structures may become exposed after some of the propellant has burned. For example, the suppression structures may become exposed and interact with exhaust after the propellant has burned for around one half of the full burning time.

Figure 11:
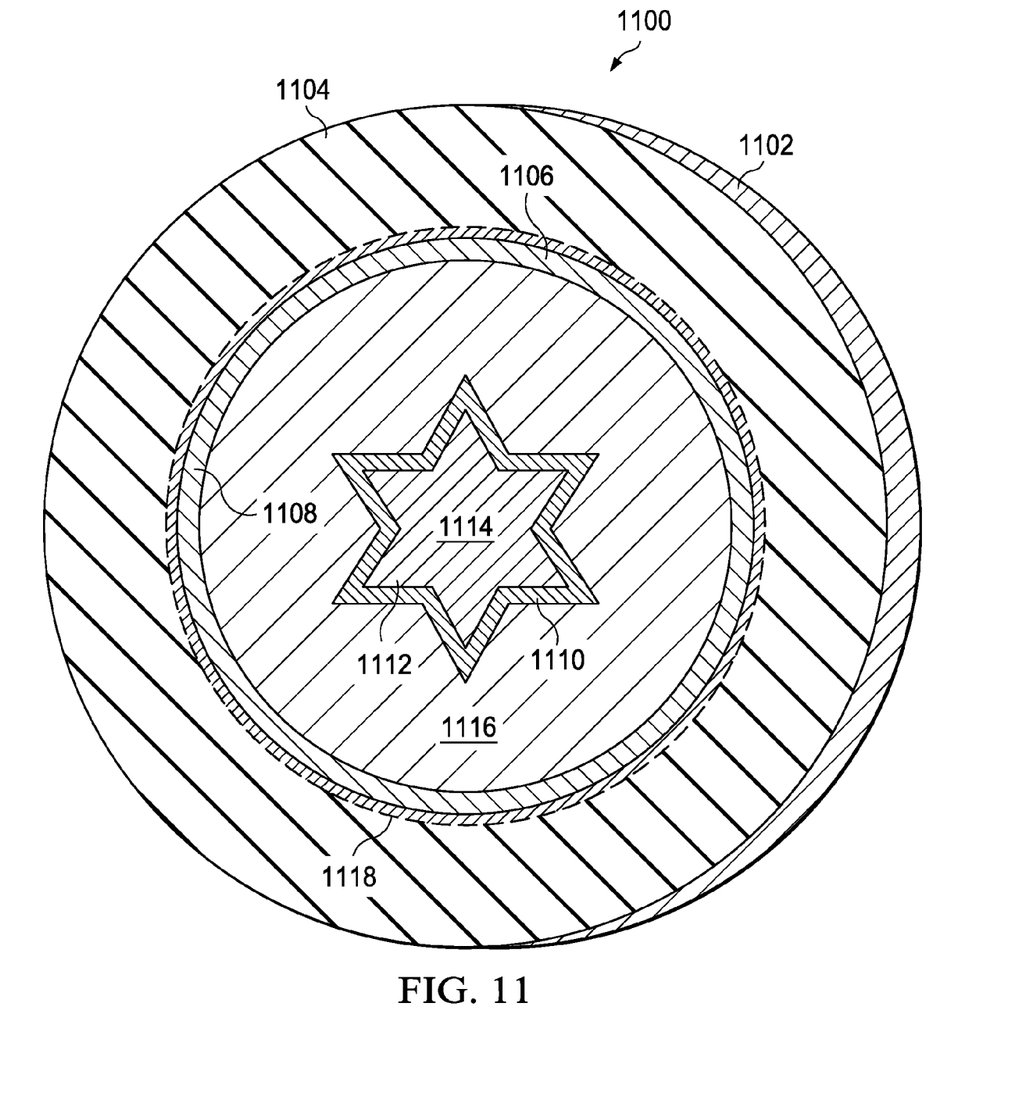
FIG. 11 is a cross-sectional diagram of a suppression structure in accordance with an advantageous embodiment.

With reference now to FIG. 11, a cross-sectional diagram of a suppression structure is depicted in accordance with an advantageous embodiment. Rocket motor system 1100 is an example of one implementation for rocket motor system 204 in FIG. 2. In this example, rocket motor system 1100 is shown in a cross-sectional view showing the circumference of casing 1102 in which solid propellant 1104 is located.

Suppression structure 1106 takes the form of a nested structure. Suppression structure 1106 is an example of an implementation for suppression structure 244 in FIG. 2. In this example, suppression structure 1106 has a first rod shape nested within a second rod shape.

In this depicted example, suppression structure 1106 includes circle-shaped rod 1108 and star-shaped rod 1110 within channel 1112. Star-shaped rod 1110 is the first rod shape nested within circle-shaped rod 1108, which is the second rod shape for suppression structure 1106. Section 1114 of channel 1112 illustrates the shape of channel 1112 when solid propellant 1104 is first ignited at time equals zero. As solid propellant 1104 burns towards suppression structure 1106, the shape of channel 1112 may change to the shape of section 1116 within dotted line 1118.

In this manner, as the shape of channel 1112 changes, different components within suppression structure 1106 may continue to generate perturbations in a manner that may reduce oscillations within rocket motor system 1100.

The illustration of this particular configuration of nested rod shapes for suppression structure 1106 is not meant to imply limitations to the manner in which other advantageous embodiments may be implemented. For example, in other advantageous embodiments, other types of shapes may be used. Further, additional rod shapes may be nested other than the two illustrated. For example, in some advantageous embodiments, three, five, and/or any suitable number of rod shapes may be nested within each other for suppression structure 1106.

Figure 12:
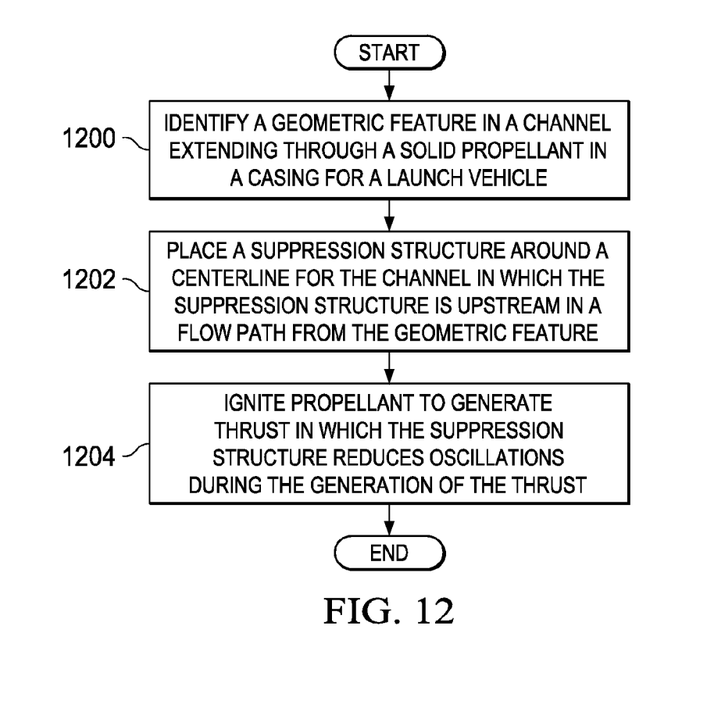
FIG. 12 is a flowchart of a process for reducing oscillations in a launch vehicle in accordance with an advantageous embodiment.

With reference now to FIG. 12, a flowchart of a process for reducing oscillations in a launch vehicle is depicted in accordance with an advantageous embodiment. The process illustrated in FIG. 12 may be implemented in a launch vehicle, such as launch vehicle 200 in FIG. 2.

The process begins by identifying a geometric feature in a channel extending through a solid propellant in a casing for a launch vehicle (operation 1200). The process places a suppression structure around a centerline for the channel in which the suppression structure is upstream in a flow path from the geometric feature (operation 1202). The solid propellant may then be ignited to generate thrust in which the suppression structure reduces oscillations during the generation of the thrust (operation 1204), with the process terminating thereafter.

Thus, the different advantageous embodiments provide a method and apparatus for reducing thrust oscillations in a launch vehicle. In the different advantageous embodiments, the launch vehicle may comprise a casing, a solid propellant located within the casing, a channel through the solid propellant, a geometric feature in the channel, and a suppressant structure located around a centerline for the channel and located upstream in a flow path from the geometric feature.

The different advantageous embodiments may provide a capability to minimize oscillations that may occur during the generation of thrust by the solid propellant. In the different advantageous embodiments, the suppression structure may be capable of interacting with the flow path to change the flow field such that perturbations that may be generated do not interact in a manner that causes oscillations.

The different advantageous embodiments may provide a capability to avoid designs that may reduce the efficiency and/or increase the cost of a launch vehicle. The different advantageous embodiments may not require changes to existing designs or desired designs for a launch vehicle.

The description of the different advantageous embodiments has been presented for purposes of illustration and description, and it is not intended to be exhaustive or limited to the embodiments in the form disclosed. Many modifications and variations will be apparent to those of ordinary skill in the art. Further, different advantageous embodiments may provide different advantages as compared to other advantageous embodiments.

The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A launch vehicle comprising:
   a casing;
   a solid propellant located within the casing;
   a channel through the solid propellant;
   a geometric feature in the channel; and
   a suppression structure, comprising a rod, located around a centerline for the channel and located entirely forward of the geometric feature with respect to a direction of travel of the launch vehicle, wherein the suppression structure is configured to reduce or eliminate an interaction of perturbations with the geometric feature in a manner that reduces or eliminates oscillations in thrust.

2. The launch vehicle of claim 1, wherein the suppression structure is configured to change a flow of exhaust around the geometric feature in the channel during burning of the solid propellant.

3. The launch vehicle of claim 1, wherein the suppression structure is configured to reduce feedback from vortical structures interacting with the geometric feature within the channel.

4. The launch vehicle of claim 1, wherein the suppression structure is secured to the casing.

5. The launch vehicle of claim 1, wherein the suppression structure is embedded within the solid propellant.

6. The launch vehicle of claim 1, wherein the rod is a circle-shaped rod having a cross-sectional diameter configured to generate perturbations at a frequency during a generation of thrust.

7. The launch vehicle of claim 1, wherein the rod is a circle-shaped rod having a diameter configured to generate perturbations at a radial location in a flow path during a generation of thrust.

8. The launch vehicle of claim 1, wherein the suppression structure has a distance from the geometric feature selected to reduce a generation of perturbations by the geometric feature in the channel.

9. The launch vehicle of claim 1, wherein the rod has a shape selected from one of a circle, a semi-circle, a star, a hexagon, and an octagon.

10. The launch vehicle of claim 1, wherein the rod comprises a first rod having a first shape nested inside of a second rod having a second shape.

11. The launch vehicle of claim 1, wherein the solid propellant comprises:
    a first segment of solid propellant; and
    a second segment of solid propellant located within the casing and adjacent to the first segment of solid propellant, wherein a gap is present between the first segment of solid propellant and the second segment of solid propellant, and wherein the gap is the geometric feature.

12. The launch vehicle of claim 1, wherein the geometric feature is selected from one of a factory joint, a field joint, a first shape resulting from a first change in a cross-sectional diameter of a rod from which the suppression structure is constructed, a change in a diameter of the suppression structure, and a second shape resulting from a second change in a distance defined by a width of the channel relative to the centerline for the channel around which the suppression structure is located and from which perturbations are generated.

13. The launch vehicle of claim 1, wherein the geometric feature is selected from one of a gap and a step in a surface of the solid propellant in the channel.

* * * * *